(12) United States Patent
Ahuja et al.

(10) Patent No.: US 12,547,534 B2
(45) Date of Patent: Feb. 10, 2026

(54) MULTI DEVICE AND PLATFORM AUTOMATION TESTING MECHANISM USING ARTIFICIAL INTELLIGENCE (AI)

(71) Applicant: Bank of America Corporation, Charlotte, NC (US)

(72) Inventors: Yogi Ahuja, Warwick, PA (US); Hui Ouyang, Bear, DE (US); Jeonghoon Lee, East Brunswick, NJ (US)

(73) Assignee: Bank of America Corporation, Charlotte, NC (US)

( * ) Notice: Subject to any disclaimer, the term of this patent is extended or adjusted under 35 U.S.C. 154(b) by 207 days.

(21) Appl. No.: 18/368,271

(22) Filed: Sep. 14, 2023

(65) Prior Publication Data

US 2025/0094327 A1 Mar. 20, 2025

(51) Int. Cl.
| | |
|---|---|
| *G06F 11/3698* | (2025.01) |
| *G06F 8/30* | (2018.01) |
| *G06F 16/958* | (2019.01) |
| *G06N 5/022* | (2023.01) |

(52) U.S. Cl.
CPC ............ *G06F 11/3698* (2025.01); *G06F 8/30* (2013.01); *G06F 16/986* (2019.01); *G06N 5/022* (2013.01)

(58) Field of Classification Search
CPC ...... G06F 11/3698; G06F 16/986; G06F 8/30; G06F 16/24578; G06F 21/128; G06F 11/3466; G06F 11/3692; G06N 5/022
See application file for complete search history.

(56) References Cited

U.S. PATENT DOCUMENTS

| | | |
|---|---|---|
| 5,715,373 A | 2/1998 | Desgrousilliers et al. |
| 5,724,273 A | 3/1998 | Desgrousilliers et al. |
| 7,039,899 B1 | 5/2006 | Quiroga |
| 7,559,001 B2 | 7/2009 | Betawar et al. |
| 7,721,265 B1 | 5/2010 | Xu et al. |
| 9,032,253 B2 | 5/2015 | McCoy et al. |
| 9,176,851 B2 | 11/2015 | Jain et al. |

(Continued)

OTHER PUBLICATIONS

Mark Grechanik et al.; Maintaining and Evolving GUI-Directed Test Scripts; IEEE; pp. 408-418; retrieved on Sep. 9, 2025 (Year: 2009).*

*Primary Examiner* — S. Sough
*Assistant Examiner* — Cuong V Luu
(74) *Attorney, Agent, or Firm* — Banner & Witcoff, Ltd.

(57) ABSTRACT

A computing platform may receive a script for a web page, which may be configured to render the web page according to a plurality of different permutations based on system parameters. The computing platform may execute the script to produce the plurality of different permutations of the web page. The computing platform may compare the plurality of different permutations of the web page to corresponding expected renderings of the web page to produce performance scores. The computing platform may compare the performance scores to a performance threshold. Based on identifying that a performance score fails to meet the performance threshold, the computing platform may input the script into an AI script fixing engine to produce a script modification to address performance discrepancies produced by the script. The computing platform may update the script based on the script modification, and may send, to a script repository system, the updated script.

20 Claims, 8 Drawing Sheets

(56) References Cited

U.S. PATENT DOCUMENTS

| | | |
|---|---|---|
| 9,753,842 B2 | 9/2017 | Raghavan et al. |
| 10,248,552 B2 | 4/2019 | Yi |
| 10,613,968 B2 | 4/2020 | Yi |
| 10,635,407 B2 | 4/2020 | Gorenshtein |
| 10,997,059 B2 | 5/2021 | Yi |
| 2004/0008825 A1 | 1/2004 | Seeley et al. |
| 2009/0204945 A1 | 8/2009 | Jain et al. |
| 2015/0324274 A1 | 11/2015 | Raghavan et al. |
| 2017/0228220 A1 | 8/2017 | Dai et al. |
| 2017/0324803 A1* | 11/2017 | Shaath ................ G06F 11/3688 |
| 2018/0024914 A1 | 1/2018 | Yi |
| 2018/0081793 A1 | 3/2018 | Yi |
| 2019/0095319 A1 | 3/2019 | Yi |
| 2020/0073686 A1* | 3/2020 | Hanke ..................... G06F 18/22 |
| 2022/0004958 A1* | 1/2022 | Kilic .................. G06Q 30/0246 |
| 2022/0358031 A1* | 11/2022 | Yanamala ........... G06F 11/3688 |

\* cited by examiner

MULTI DEVICE AND PLATFORM AUTOMATION TESTING MECHANISM USING ARTIFICIAL INTELLIGENCE (AI)

BACKGROUND

In some instances, scripts may be used to produce and/or otherwise support graphical user interfaces. In instances where new updates are rolled out, bugs are fixed, and/or the scripts are otherwise modified, this may result in errors at the interface level. This may be further complicated where the script supports a plurality of permutations of an interface (e.g., for different devices, operating systems, browsers, or the like). For example, the error may track through a subset of the permutations, without impacting others. Accordingly, it may be important to provide improved script testing/validation procedures to ensure interface accuracy.

SUMMARY

Aspects of the disclosure provide effective, efficient, scalable, and convenient technical solutions that address and overcome the technical problems associated with multi-device and platform interfaces. In one or more instances, a computing platform having at least one processor, a communication interface, and memory may receive a script for a web page, which may be configured to render the web page according to a plurality of different permutations based on system parameters. The computing platform may execute the script to produce the plurality of different permutations of the web page (e.g., which may be captured using a user interface capturing tool). The computing platform may compare each of the plurality of different permutations of the web page to a corresponding expected rendering of the web page to produce performance scores for each of the plurality of different permutations of the web page. The computing platform may compare the performance scores to a performance threshold. Based on identifying that at least one of the performance scores fails to meet or exceed the performance threshold, the computing platform may input the script into an artificial intelligence (AI) script fixing engine to produce a script modification to address a discrepancy between the plurality of different permutations of the web page and the corresponding expected renderings of the web page. The computing platform may update the script based on the script modification. The computing platform may send, to a script repository system, the updated script and one or more commands directing the script repository system to store the updated script.

In one or more examples, the system parameters may include one or more of: device type, operating system, browser, display properties, or interface language. In one or more examples, the computing platform may identify the corresponding expected renderings of the web page by performing one or more of: 1) selecting, from a database of stored expected web page renderings, the corresponding expected renderings of the web page, or 2) generating, using an AI image/video processing and comparison engine, the corresponding expected renderings of the web page.

In one or more instances, generating, using the AI image/video processing and comparison engine, the corresponding expected renderings of the web page may include modifying a first expected rendering of the web page associated with a first set of the system parameters based on known properties of a second set of the system parameters. In one or more instances, generating, using the AI image/video processing and comparison engine, the corresponding expected renderings of the web page may include modifying a first expected rendering of the web page associated with a first set of the system parameters based on a known correlation between a first expected rendering of a different web page associated with the first set of the system parameters and a second expected rendering of the different web page associated with a second set of the system parameters, where modifying the first expected rendering of the web page may produce an expected rendering of the web page associated with the second set of the system parameters.

In one or more examples, the computing platform may train, using historical rendering information, the AI image/video processing and comparison engine, which may configure the AI image/video processing and comparison engine to: generate the corresponding expected renderings of the web page and the performance scores. In one or more examples, the performance scores may correspond to one or more of: functional testing, security validation, performance testing, stability testing, cross operating system testing, and fine tuning script testing.

In one or more instances, the computing platform may train, using historical interface performance discrepancies, historical script modifications, and historical script execution results, the AI script fixing engine, which may configure the AI script fixing engine to output, for a given input script and corresponding performance discrepancy, a proposed script modification. In one or more instances, the computing platform may re-compare, after updating the script based on the script modification, each of the plurality of different permutations of the web page to a corresponding expected rendering of the web page to produce updated performance scores for each of the plurality of different permutations of the web page. The computing platform may compare the updated performance scores to a performance threshold, where sending the updated script to the script repository system may be based on identifying that the updated performance scores meet or exceed the performance threshold.

In one or more examples, based on identifying that all of the performance scores meet or exceed the performance threshold, the computing platform may: 1) send, to an enterprise user device: a script report indicating performance results of the script, and one or more commands directing the enterprise user device to display the script report, which may cause the enterprise user device to display the script report, and 2) send, to the script repository system, the script and one or more commands directing the script repository system to store the script. In one or more examples, the computing platform may update, using a dynamic feedback loop and based on one or more of: the script, the script modification, the discrepancy between the plurality of different permutations of the web page associated and the corresponding expected renderings of the web page, or the performance scores, the AI script fixing engine.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for using artificial intelligence (AI) for multi-device and platform testing automation are described herein. For example, testing similar use cases across different browsers, devices, or the like may be time consuming, especially when scripts are modified to accommodate new requirements, fix bugs, or the like, as the same process must be repeated again and again.

To address this deficiency, described herein is an engine that may develop its own intelligence over time to fix scripts/code by itself and run the automation testing again and again until all scripts are passed. The system may include an AI image/video processing and comparison engine, which may: 1) receive test scripts and expected user interface (UI) images or videos, 2) compare the expected UI images/videos with rendered UI images/videos to produce a test result, 3) utilize a UI capturing tool to automatically render test code and create image captures, and 4) send information on failed tests to the AI scripting fixing engine for automatic code improvement.

The UI capturing tool may communicate with the AI image/video processing and comparison engine and capture web pages (images, video, or the like) running on various devices/systems/operating systems using test scripts received from the AI image/video processing and comparison engine. The AI script fixing engine may: 1) receive failed test code and information from the AI image/video processing and comparison engine, 2) automatically modify and improve the code before sending it back to the AI image/video processing and comparison engine, and 3) continue modification and improvement until the test is successful.

This may provide a comparison mechanism for identifying the correct behavior of an application, functional testing, assessing technology, automated issue remediation, and use AI to accommodate the changing nature of testing. These and other features are described further herein.

Figure 1A:
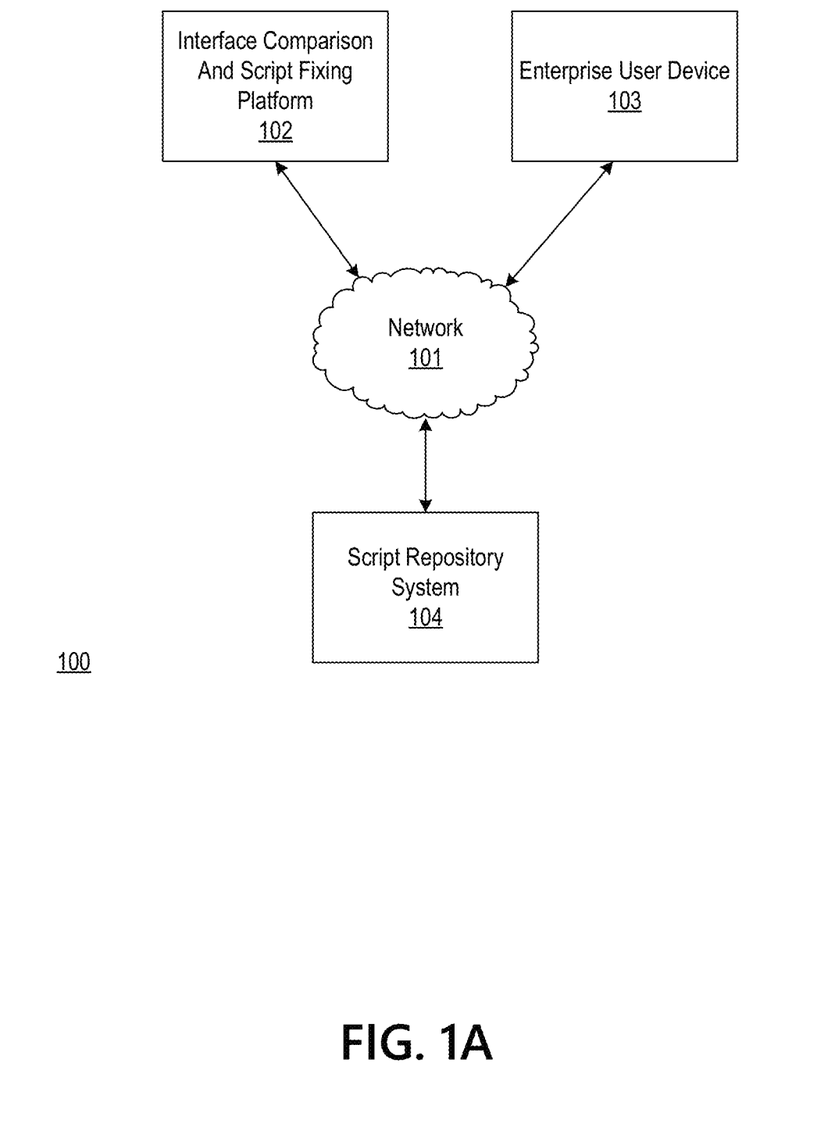
FIGS. 1A-1B depict an illustrative computing environment for using artificial intelligence (AI) for multi-device and platform testing automation in accordance with one or more example embodiments.
Figure 1B:
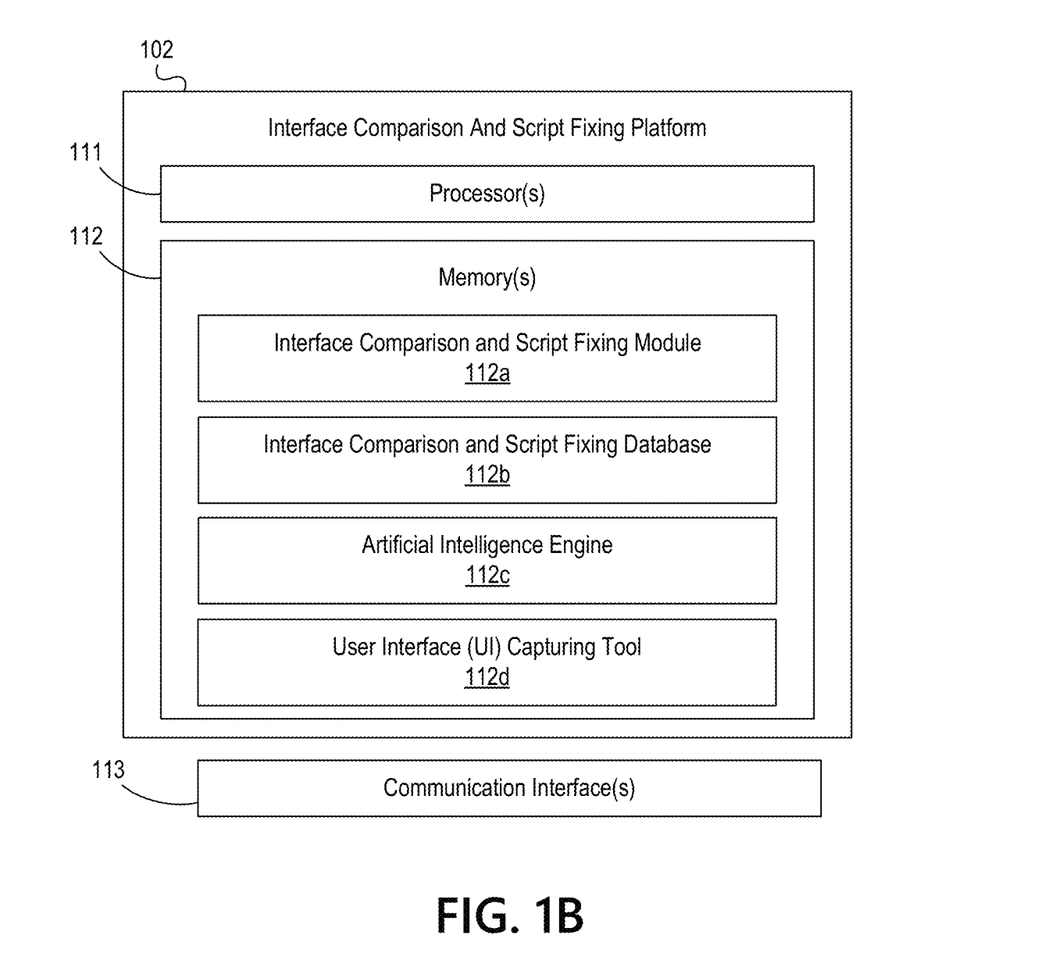

FIGS. 1A-1B depict an illustrative computing environment for using artificial intelligence (AI) for multi-device and platform testing automation in accordance with one or more example embodiments. Referring to FIG. 1A, computing environment 100 may include one or more computer systems. For example, computing environment 100 may include interface comparison and script fixing platform 102, enterprise user device 103, and script repository system 104.

As described further below, interface comparison and script fixing platform 102 may be a computer system that includes one or more computing devices (e.g., servers, server blades, or the like) and/or other computer components (e.g., processors, memories, communication interfaces) that may be used to provide interface comparison and script fixing services. For example, interface comparison and script fixing platform 102 may be configured to train, host, and/or otherwise maintain an AI image/video processing and comparison engine, which may be configured to generate expected interfaces, perform interface comparison, and/or generate performance scores accordingly. The interface comparison and script fixing platform 102 may further be configured to train, host, and/or otherwise maintain an AI script fixing engine, which may be configured to generate script modifications to address interface discrepancies Enterprise user device 103 may be and/or otherwise include a laptop computer, desktop computer, mobile device, tablet, smartphone, and/or other device that may be used by an individual (such as a systems administrator and/or other employee of an organization) to provide and/or otherwise modify interface scripts. In some instances, enterprise user device 103 may be configured to display one or more user interfaces (e.g., identity script performance interfaces, or the like).

Script repository system 104 may be a computer system that includes one or more computing devices (e.g., servers, server blades, or the like) and/or other computer components (e.g., processors, memories, communication interfaces) that may be used to store pre-tested scripts for deployment. For example, once script performance has been validated by the interface comparison and script fixing platform 102, the script repository system 104 may receive and store the corresponding scripts.

Although an enterprise user device 103 is shown, any number of such devices may be deployed in the systems/methods described below without departing from the scope of the disclosure.

Computing environment 100 also may include one or more networks, which may interconnect interface comparison and script fixing platform 102, enterprise user device 103, script repository system 104, or the like. For example, computing environment 100 may include a network 101 (which may interconnect, e.g., interface comparison and script fixing platform 102, enterprise user device 103, script repository system 104, or the like).

In one or more arrangements, interface comparison and script fixing platform 102, enterprise user device 103, and script repository system 104 may be any type of computing device capable of sending and/or receiving requests and processing the requests accordingly. For example, interface comparison and script fixing platform 102, enterprise user device 103, script repository system 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of interface comparison and script fixing platform 102, enterprise user device 103, and script repository system 104 may, in some instances, be special-purpose computing devices configured to perform specific functions.

Referring to FIG. 1B, interface comparison and script fixing platform 102 may include one or more processors 111, memory 112, and communication interface 113. A data bus may interconnect processor 111, memory 112, and communication interface 113. Communication interface 113 may be a network interface configured to support communication between interface comparison and script fixing platform 102 and one or more networks (e.g., network 101, or the like). Memory 112 may include one or more program modules having instructions that when executed by processor 111 cause interface comparison and script fixing platform 102 to perform one or more functions described herein and/or one or more databases that may store and/or otherwise maintain information which may be used by such program modules and/or processor 111. In some instances, the one or more program modules and/or databases may be stored by and/or maintained in different memory units of interface comparison and script fixing platform 102 and/or by different computing devices that may form and/or otherwise make up interface comparison and script fixing platform 102. For example, memory 112 may have, host, store, and/or include interface comparison and script fixing module 112a, interface comparison and script fixing database 112b, artificial intelligence engine 112c, and/or user interface (UI) capturing tool 112d.

Interface comparison and script fixing module 112a may have instructions that direct and/or cause interface comparison and script fixing platform 102 to provide improved script approval and correction techniques, as discussed in greater detail below. Interface comparison and script fixing database 112b may store information used by interface comparison and script fixing module 112a and/or interface comparison and script fixing platform 102 in application of advanced techniques to provide improved script approval and correction techniques, and/or in performing other functions. Artificial intelligence engine 112c may train, host, and/or otherwise refine one or more models that may be used to perform automated interface generation, performance scoring, automated script correction, and/or other functions. UI capturing tool 112d may be configured to capture images of rendered web pages and compare them to expected web pages, as is described further below. Although the UI capturing tool 112d is illustrated as being part of and/or otherwise integrated into the interface comparison and script fixing platform 102, in some instances, these may be separate and/or otherwise distinct devices without departing from the scope of the disclosure.

Figure 2A:
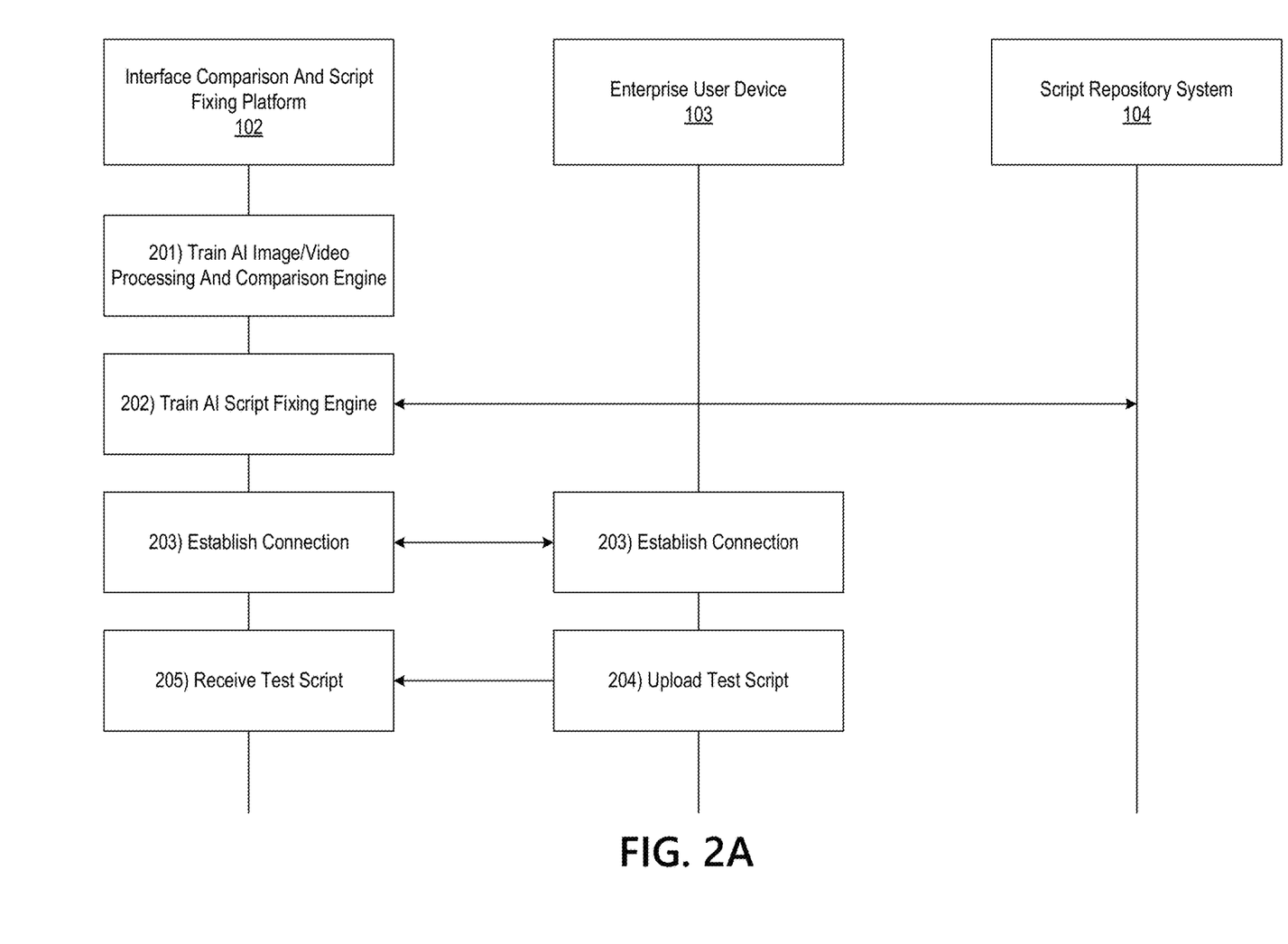
FIGS. 2A-2D depict an illustrative event sequence for using artificial intelligence (AI) for multi-device and platform testing automation in accordance with one or more example embodiments.

FIGS. 2A-2D depict an illustrative event sequence for using artificial intelligence (AI) for multi-device and platform testing automation in accordance with one or more example embodiments. Referring to FIG. 2A, at step 201, the interface comparison and script fixing platform 102 may train an AI image/video processing and comparison engine. For example, the interface comparison and script fixing platform 102 may train the AI image/video processing and comparison engine to produce expected interface images/video (which may, e.g., be used as a source of truth for comparison against rendered interface images/videos), generate script performance scores, and/or perform other functions. For example, the interface comparison and script fixing platform 102 may receive historical interface generation information (e.g., scripts, images, videos, parameter information, and/or other information), performance score information, and/or other information. The interface comparison and script fixing platform 102 may input the historical interface generation information into the AI image/video processing and comparison engine to train the AI image/video processing and comparison engine to produce expected interface images/video (e.g., in the event that expected interface images/video are not otherwise available) by establishing stored correlations between interfaces, parameters, requirements, or the like. The interface comparison and script fixing platform 102 may similarly input the historical interface generation information into the AI image/video processing and comparison engine to train the AI image/video processing and comparison engine to produce performance scores by establishing stored correlations between performance information, interfaces, scripts, image/video similarity, interface requirements, and/or otherwise. In doing so, the interface comparison and script fixing platform 102 may train the AI image/video processing and comparison engine to identify, based on a script and/or other available expected interfaces, the remaining expected interfaces, and to subsequently identify, based on a comparison of rendered interfaces to the expected interfaces and/or other performance parameters/requirements, performance scores for the script.

In some instances, the AI image/video processing and comparison engine may be trained to compare these performance scores to one or more performance thresholds, and to route the script for automated correction if any of the scores fail to meet or exceed the threshold.

In some instances, in training the AI image/video processing and comparison engine, the interface comparison and script fixing platform 102 may train a supervised learning model (e.g., decision tree, bagging, boosting, random forest, neural network, linear regression, artificial neural network, support vector machine, and/or other supervised learning model), unsupervised learning model (e.g., classification, clustering, anomaly detection, feature engineering, feature learning, and/or other unsupervised learning models), and/or other model.

At step 202, the interface comparison and script fixing platform 102 may train an AI script fixing engine. For example, the interface comparison and script fixing platform 102 may train the AI script fixing engine to identify and produce script modifications. For example, the interface comparison and script fixing platform 102 may receive historical script modification information, script errors, and/or other information. The interface comparison and script fixing platform 102 may input the historical script modification information, script errors, and/or other information into the AI script fixing engine to train the AI script fixing engine to produce proposed script modifications to address identified errors, interface discrepancies, performance issues, and/or otherwise by establishing stored correlations between modifications and the corresponding errors, interface discrepancies, performance issues, or the like. In doing so, the interface comparison and script fixing platform 102 may train the AI script fixing engine to identify, based on a comparison of an identified error, interface discrepancy, performance issue, or the like, a modification for the script accordingly.

In some instances, in training the AI script fixing engine, the interface comparison and script fixing platform 102 may train a supervised learning model (e.g., decision tree, bagging, boosting, random forest, neural network, linear regression, artificial neural network, support vector machine, and/or other supervised learning model), unsupervised learning model (e.g., classification, clustering, anomaly detection, feature engineering, feature learning, and/or other unsupervised learning models), and/or other model.

At step 203, the enterprise user device 103 may establish a connection with interface comparison and script fixing platform 102. For example, the enterprise user device 103 may establish a first wireless data connection with the interface comparison and script fixing platform 102 to link the enterprise user device 103 to the interface comparison and script fixing platform 102 (e.g., in preparation for uploading a test script). In some instances, the enterprise user device 103 may identify whether or not a connection is already established with the interface comparison and script fixing platform 102. If a connection is already established with the interface comparison and script fixing platform 102, the enterprise user device 103 might not re-establish the connection. Otherwise, if a connection is not yet established with the interface comparison and script fixing platform 102, the enterprise user device 103 may establish the first wireless data connection as described herein.

At step 204, the enterprise user device 103 may send or otherwise upload a test script to the interface comparison and script fixing platform 102. For example, the enterprise user device 103 may upload a script that supports a plurality of permutations of a graphical user interface. Additionally or alternatively, the enterprise user device 103 may upload multiple scripts, each supporting a single permutation of the graphical user interface. In some instances, the enterprise user device 103 may upload the test script to the interface comparison and script fixing platform 102 while the first wireless data connection is established.

At step 205, the interface comparison and script fixing platform 102 may receive the test script sent or otherwise uploaded at step 204. For example, the interface comparison and script fixing platform 102 may receive the test script via the communication interface 113 and while the first wireless data connection is established.

Figure 2B:
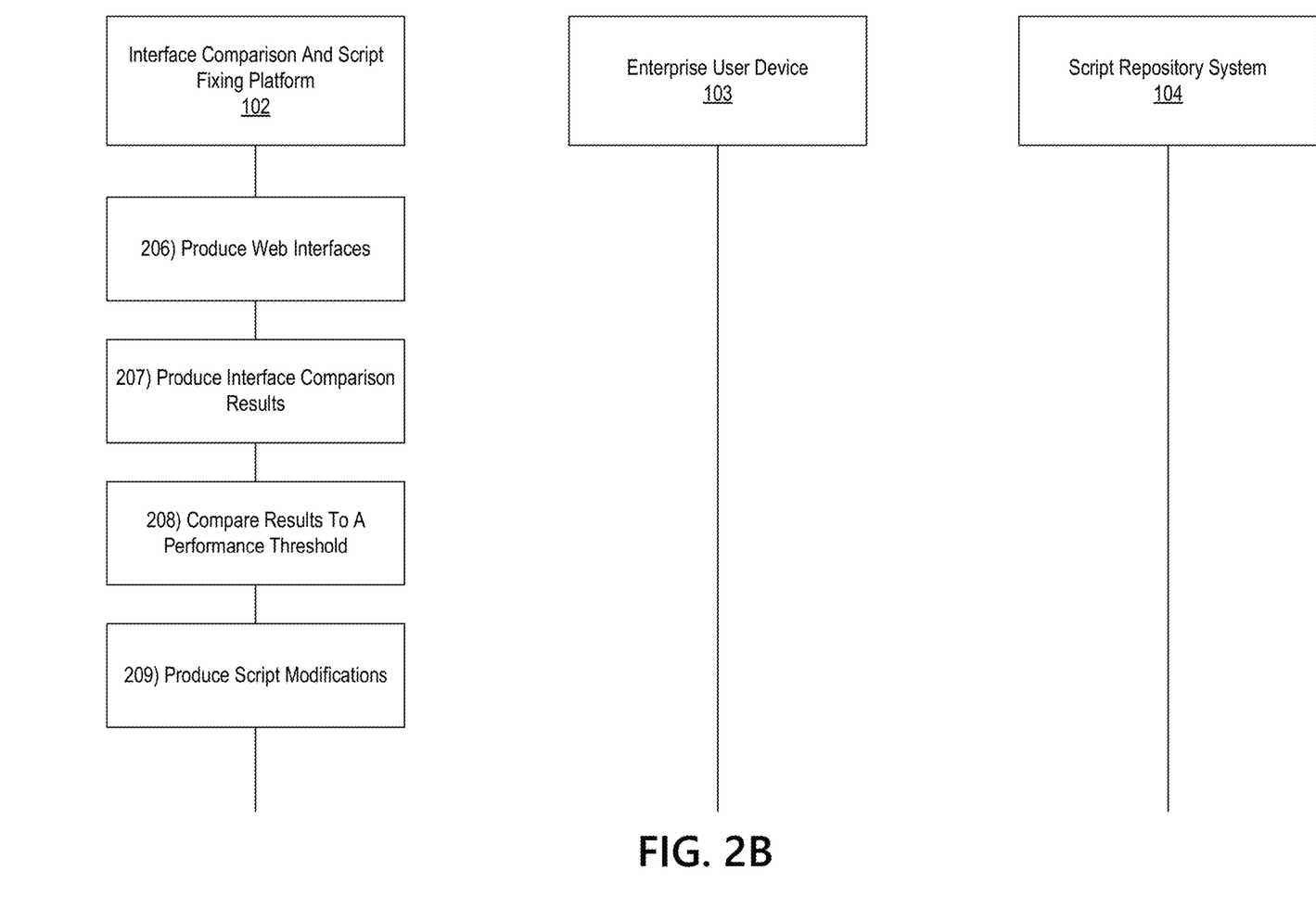

Referring to FIG. 2B, at step 206, the interface comparison and script fixing platform 102 may execute the test script to render a plurality of permutations of a graphical user interface. For example, the interface comparison and script fixing platform 102 may render a permutation for each potential combination of device type, operating system, browser, display properties, interface language, and/or other associated interface properties. These interfaces may be captured by the interface comparison and script fixing platform 102 using, for example, the UI capturing tool 112d.

At step 207, the interface comparison and script fixing platform 102 may produce interface comparison results for the rendered graphical user interfaces (e.g., captured by the UI capturing tool 112d). For example, the interface comparison and script fixing platform 102 may compare the rendered graphical user interfaces to expected interfaces. In some instances, to identify the corresponding expected renderings of the web page, the interface comparison and script fixing platform 102 may perform one or more of: selecting, from a database of stored expected web page renderings, the corresponding expected renderings of the web page, or generating, using an AI image/video processing and comparison engine, the corresponding expected renderings of the web page.

For example, the interface comparison and script fixing platform 102 may access any available expected interfaces (e.g., indicating a source of truth and/or otherwise validated interface that may be used for comparison) corresponding to the rendered interfaces. For example, some the interface comparison and script fixing platform 102 may, in some instances, have a stored expected interface for a given permutation (which may, e.g., have been captured by the UI capturing tool 112d), and thus might not need to re-generate the expected interface for comparison. Rather this stored expected interface may be used for the comparison as described below. For any permutations of the interface where an expected interface is not available, the interface comparison and script fixing platform 102 may generate a corresponding expected interface.

For example, the interface comparison and script fixing platform 102 may input the test script, the desired permutations, and/or other information into the AI image/video processing and comparison engine, and the AI image/video processing and comparison engine may output the corresponding expected interfaces accordingly. For example, to identify a given expected rendering of the interface, the AI image/video processing and comparison engine may modify, based on known requirements for the corresponding permutation, an expected rendering for a different permutation. For example, if the AI image/video processing and comparison engine has access to (e.g., from an expected interface database, or the like) a first expected interface for a first permutation associated with a first pixel count, and knows that a second permutation has a requirement of at least a second pixel count, the AI image/video processing and comparison engine may modify the pixel count of the first expected interface to produce a second expected interface for the second permutation.

Additionally or alternatively, the AI image/video processing and comparison engine may extrapolate an expected interface based on parameter correlations and relationships between permutations for a separate web page/interface. For example, expected interfaces may be known for both a first and second permutation of a different web site or interface. Similarly, an expected interface may be known for the first permutation (which may, e.g., have the same parameters) of a web site or interface at issue (e.g., corresponding to the script). In these instances, the AI image/video processing and comparison engine may identify an interface for the second permutation of the web site or interface corresponding to the script by understanding the correlation between how the interface was modified between permutations for the other web site or interface, and modifying the expected interface for the first permutation accordingly. In some instances, in producing the expected interfaces, the AI image/video processing and comparison engine may modify an interface format to accommodate different languages, pixel counts, resolutions, system parameters, resize interface elements, and/or otherwise.

Once the expected interfaces have been produced (e.g., has a source of truth), the interface comparison and script fixing platform 102 may compare the rendered interfaces against the expected interfaces to identify any discrepancies. In some instances, in doing so, the interface comparison and script fixing platform 102 may compare screen captures, images, video sequences (e.g., does an interface element change color when selected, or the like), and/or other aspects of the interface. Similarly, the interface comparison and script fixing platform 102 may compare the rendered interfaces against any known requirements, performance baselines, and/or otherwise. For any identified discrepancies between the images and/or violations of known requirements or performance baselines, the AI image/video processing and comparison engine may produce a performance score (e.g., a value between 0-10, or the like where 10 indicates no discrepancy and 0 indicates a significant discrepancy). In some instances, the performance scores may correspond to functional testing, security validation, performance testing, stability testing, cross operating system testing, interface comparisons, and/or other test.

Figure 5:
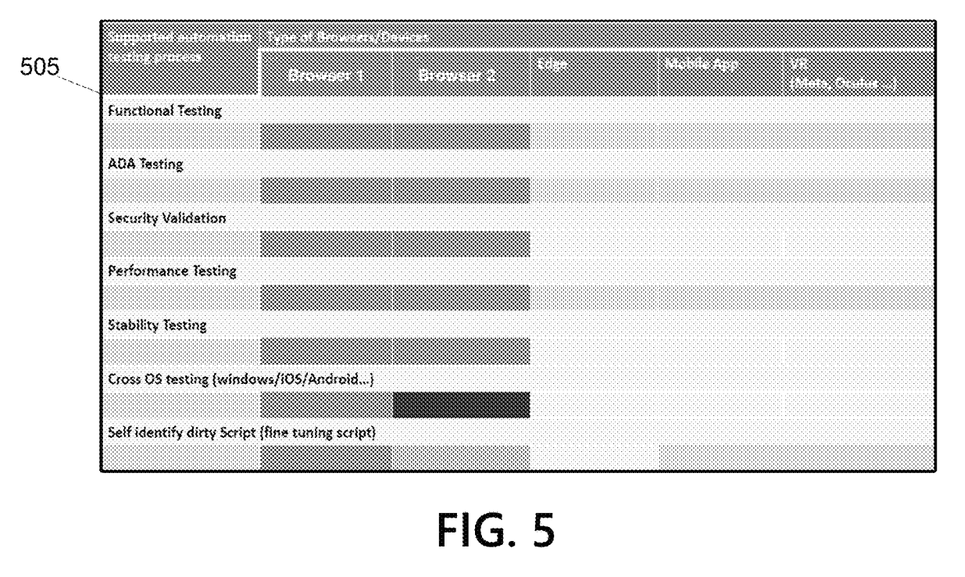

At step 208, the interface comparison and script fixing platform 102 may compare the comparison results (e.g., the performance scores generated at step 207) to a performance threshold. For example, the interface comparison and script fixing platform 102 may indicate that any performance score below a threshold of 10 (e.g., thus indicating any possible discrepancies or deviations) indicates an error. In some instances, the interface comparison and script fixing platform 102 may send results of the comparison to the enterprise user device 103. For example, the interface comparison and script fixing platform 102 may send a script report as shown in graphical user interface 505 of FIG. 5. In instances where the interface comparison and script fixing platform 102 identifies that the performance threshold is met or exceeded, the interface comparison and script fixing platform 102 may proceed to step 214. Otherwise, if the performance threshold is not met or exceeded, the interface comparison and script fixing platform 102 may proceed to step 209.

At step 209, the interface comparison and script fixing platform 102 may input the identified discrepancies, performance issues, requirement failures, the script, parameters of the failing interface permutations, and/or other information into the AI script fixing engine, which may then output a proposed script modification (e.g., by correlating the identified discrepancies with historical discrepancies for similar permutations, and identified how such discrepancies were historically addressed through script modifications).

Figure 2C:
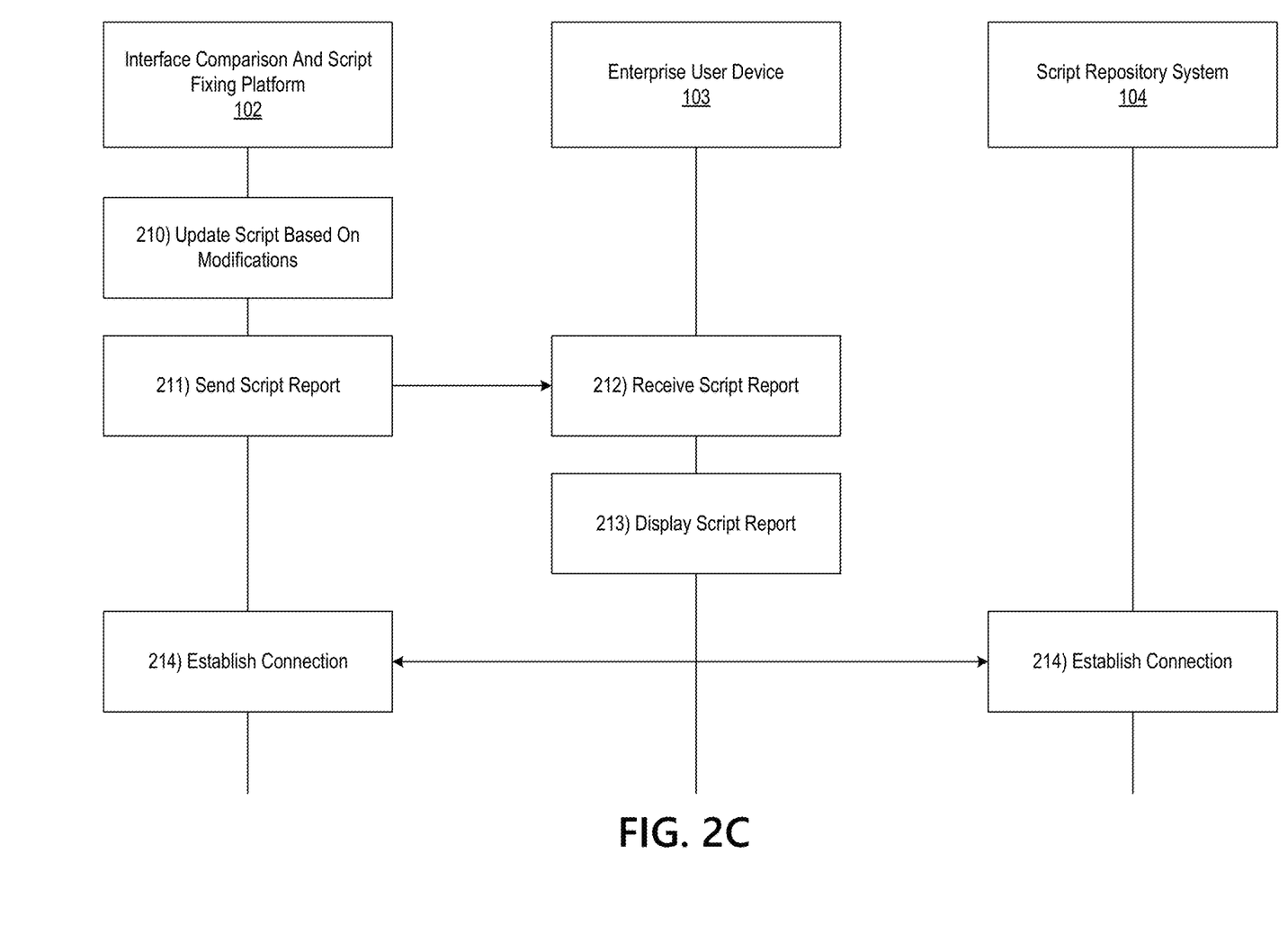

Referring to FIG. 2C, at step 210, the interface comparison and script fixing platform 102 may update the script based on the modifications output at step 209. For example, the AI script fixing engine may automatically update the script based on the proposed modifications in an attempt to remediate any errors. Once updated, the interface comparison and script fixing platform 102 may return to step 206 to re-render the interfaces and identify whether any further deviations/discrepancies are identified.

At step 211, the interface comparison and script fixing platform 102 may generate and send a script report to the enterprise user device 103. For example, the interface comparison and script fixing platform 102 may send the script report to the enterprise user device 103 via the communication interface 113 and while the first wireless data connection is established. In some instances, the interface comparison and script fixing platform 102 may also send one or more commands directing the enterprise user device 103 to display the script report.

At step 212, the enterprise user device 103 may receive the script report sent at step 211. For example, the enterprise user device 103 may receive the script report while the first wireless data connection is established. In some instances, the enterprise user device 103 may also receive the one or more commands directing the enterprise user device 103 to display the script report.

Figure 4:
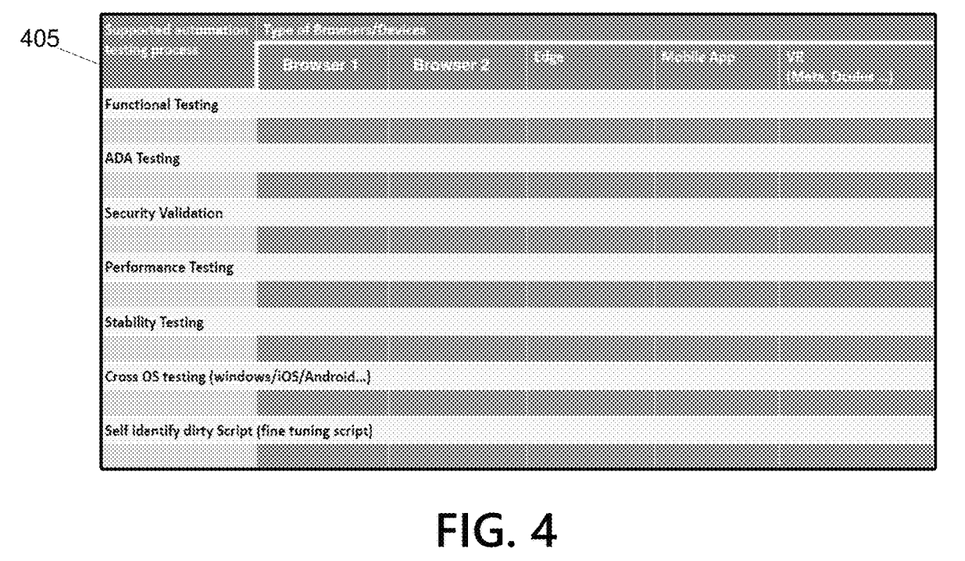
FIGS. 4-5 depict illustrative user interfaces for using artificial intelligence (AI) for multi-device and platform testing automation in accordance with one or more example embodiments.

At step 213, based on or in response to the one or more commands directing the enterprise user device 103 to display the script report, the enterprise user device 103 may display the script report. For example, the enterprise user device 103 may display a graphical user interface similar to graphical user interface 405 in FIG. 4, which may, e.g., indicate that each testing process was successful for each interface permutation.

At step 214, the interface comparison and script fixing platform 102 may establish a connection with the script repository system 104 may establish a connection with the script repository system 104. For example, the interface comparison and script fixing platform 102 may establish a second wireless data connection with the script repository system 104 to link the script repository system 104 to the interface comparison and script fixing platform 102 (e.g., in preparation for sending scripts for storage). In some instances, the interface comparison and script fixing platform 102 may identify whether or not a connection is already established with the script repository system 104. If a connection is already established with the script repository system 104, the interface comparison and script fixing platform 102 might not re-establish the connection. Otherwise, if a connection is not yet established with the script repository system 104, the interface comparison and script fixing platform 102 may establish the second wireless data connection accordingly.

Figure 2D:
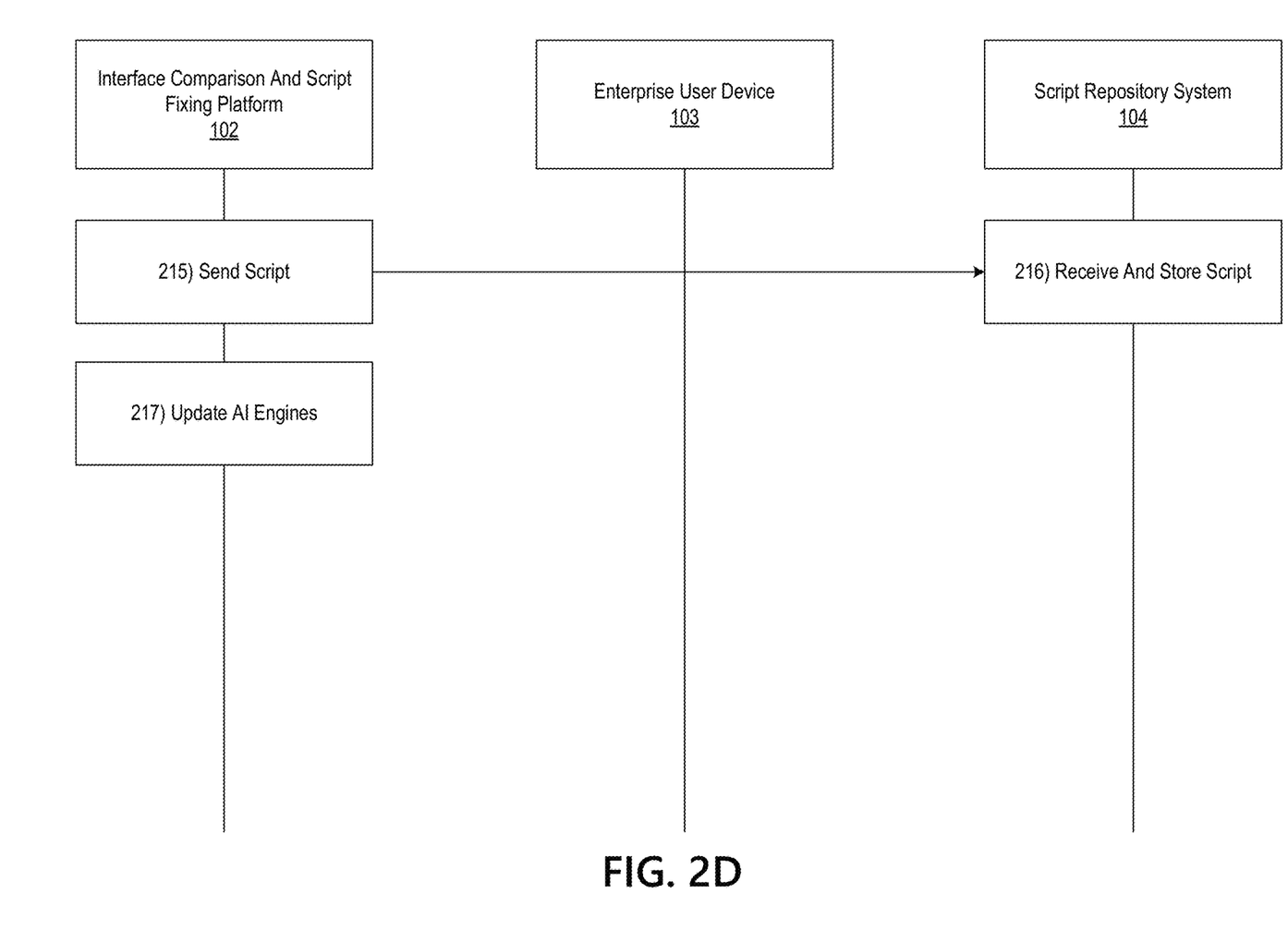

Referring to FIG. 2D, at step 215, the interface comparison and script fixing platform 102 may send the script (or, in instances where the script has been modified, the updated script) to the script repository system 104. For example, the interface comparison and script fixing platform 102 may sent the script to the script repository system 104 via the communication interface 113 and while the second wireless data connection is established. In some instances, the interface comparison and script fixing platform 102 may send one or more commands directing the script repository system 104 to store the script.

At step 216, the script repository system 104 may receive the script sent at step 215. For example, the script repository system 104 may receive the script while the second wireless data connection is established. In some instances, the script repository system 104 may also receive the one or more commands directing the script repository system 104 to store the script. Based on or in response to the one or more commands directing the script repository system 104 to store the script, the script repository system 104 may store the script.

At step 217, the interface comparison and script fixing platform 102 may update the AI image/video processing and comparison engine and/or the AI script fixing engine based on any identified and/or otherwise generated expected renderings of the interface, the script, the permutations, identified discrepancies/errors/requirement violations, script modifications, and/or other information. In doing so, interface comparison and script fixing platform 102 may continue to refine the AI image/video processing and comparison engine and/or the AI script fixing engine using a dynamic feedback loop, which may, e.g., increase the accuracy and effectiveness of the model in generating expected interface rendering, comparing interface renderings, correcting interface discrepancies, and/or otherwise.

For example, the interface comparison and script fixing platform 102 may use any identified and/or otherwise generated expected renderings of the interface, the script, the permutations, identified discrepancies/errors/requirement violations, script modifications, and/or other information to reinforce, modify, and/or otherwise update the AI image/video processing and comparison engine and/or AI script fixing engine, thus causing the models to continuously improve (e.g., in terms of image rendering, script correction, and/or otherwise).

In some instances, the interface comparison and script fixing platform 102 may continuously refine the models. In some instances, the interface comparison and script fixing platform 102 may maintain an accuracy threshold for the models, and may pause refinement (through the dynamic feedback loops) of the models if the corresponding accuracy is identified as greater than the corresponding accuracy threshold. Similarly, if the accuracy fails to be equal or less than the given accuracy threshold, the interface comparison and script fixing platform 102 may resume refinement of the models through the corresponding dynamic feedback loop.

Figure 3:
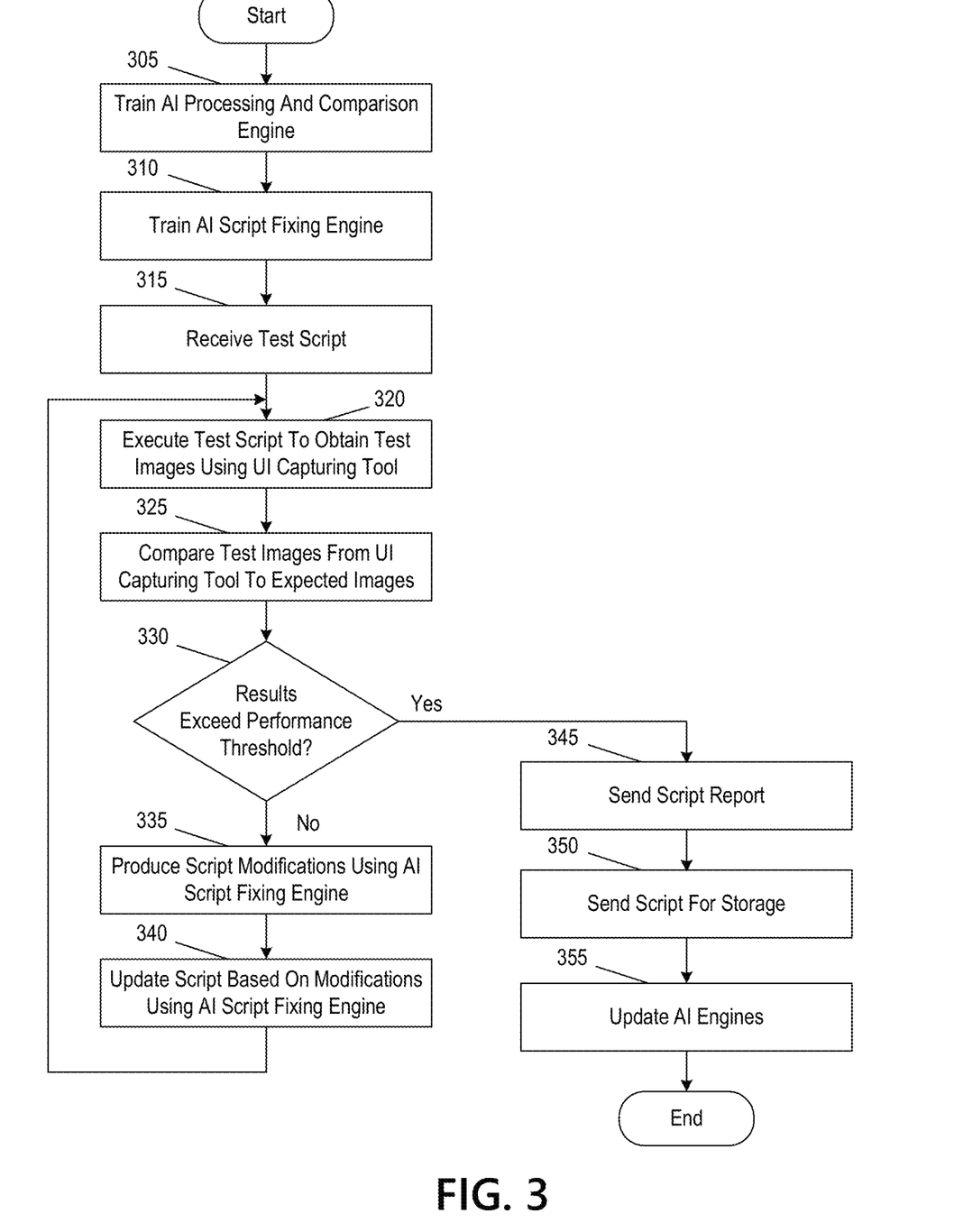
FIG. 3 depicts an illustrative method for using artificial intelligence (AI) for multi-device and platform testing automation in accordance with one or more example embodiments.

FIG. 3 depicts an illustrative method for using artificial intelligence (AI) for multi-device and platform testing automation in accordance with one or more example embodiments. At step 305, a computing platform having at least one processor, a communication interface, and memory may train an AI processing and comparison engine to generate interfaces and perform performance scoring based on interface comparison. At step 310, the computing platform may train a script fixing engine to provide automated script correction. At step 315, the computing platform may receive a test script. At step 320, the computing platform may execute the test script to obtain interface images, video, or the like using a user interface capturing tool. At step 325, the computing platform may compare the test images, videos, or the like from the user interface capturing tool to expected images, video, or the like, and/or otherwise evaluate performance of the generated interfaces. At step 330, the computing platform may identify whether or not the results of the comparison exceed a performance threshold. If the results do not exceed the performance threshold, the computing platform may proceed to step 335. At step 335, the computing platform may produce script modifications using the AI script fixing engine. At step 340, the computing platform may update the script based on the generated modifications using the AI script fixing engine, and may then return to step 320.

Returning to step 330, if the results do exceed the performance threshold, the computing platform may proceed to step 345. At step 345, the computing platform may send a script report to an enterprise user device. At step 350, the computing platform may send the script (or updated script) for storage at a script repository. At step 355, the computing platform may update the AI engines.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      receive a script for a web page, wherein the script is configured to render the web page according to a plurality of different permutations based on system parameters;
      execute the script to produce the plurality of different permutations of the web page;
      compare each of the plurality of different permutations of the web page to a corresponding expected rendering of the web page to produce performance scores for each of the plurality of different permutations of the web page;
      compare the performance scores to a performance threshold;
      based on identifying that at least one of the performance scores fails to meet or exceed the performance threshold, input the script into an artificial intelligence (AI) script fixing engine to produce a script modification to address a discrepancy between the plurality of different permutations of the web page and the corresponding expected renderings of the web page;

update the script based on the script modification; and send, to a script repository system, the updated script and one or more commands directing the script repository system to store the updated script.

2. The computing platform of claim 1, wherein the system parameters comprise one or more of device type, operating system, browser, display properties, or interface language.

3. The computing platform of claim 1, wherein the memory stores additional computer-readable instructions that, when executed by the at least one processor, further cause the computing platform to:

identify the corresponding expected renderings of the web page, wherein the identifying the corresponding expected renderings comprises one or more of:

selecting, from a database of stored expected web page renderings, the corresponding expected renderings of the web page, or generating, using an AI image/video processing and comparison engine, the corresponding expected renderings of the web page.

4. The computing platform of claim 3, wherein the generating, using the AI image/video processing and comparison engine, the corresponding expected renderings of the web page comprises:

modifying a first expected rendering of the web page associated with a first set of the system parameters based on known properties of a second set of the system parameters.

5. The computing platform of claim 3, wherein the generating, using the AI image/video processing and comparison engine, the corresponding expected renderings of the web page comprises:

modifying a first expected rendering of the web page associated with a first set of the system parameters based on a known correlation between a first expected rendering of a different web page associated with the first set of the system parameters and a second expected rendering of the different web page associated with a second set of the system parameters, wherein the modifying the first expected rendering of the web page produces an expected rendering of the web page associated with the second set of the system parameters.

6. The computing platform of claim 3, wherein the memory stores additional computer-readable instructions that, when executed by the at least one processor, further cause the computing platform to:

train, using historical rendering information, the AI image/video processing and comparison engine, wherein the training the AI image/video processing and comparison engine configures the AI image/video processing and comparison engine to generate the corresponding expected renderings of the web page and the performance scores.

7. The computing platform of claim 1, wherein the performance scores correspond to one or more of functional testing, security validation, performance testing, stability testing, cross operating system testing, and fine tuning script testing.

8. The computing platform of claim 1, wherein the memory stores additional computer-readable instructions that, when executed by the at least one processor, further cause the computing platform to:

train, using historical interface performance discrepancies, historical script modifications, and historical script execution results, the AI script fixing engine, wherein the training the AI script fixing engine configures the AI script fixing engine to output, for a given input script and corresponding performance discrepancy, a proposed script modification.

9. The computing platform of claim 1, wherein the memory stores additional computer-readable instructions that, when executed by the at least one processor, further cause the computing platform to:

re-compare, after the updating the script based on the script modification, each of the plurality of different permutations of the web page to the corresponding expected rendering of the web page to produce updated performance scores for each of the plurality of different permutations of the web page; and compare the updated performance scores to the performance threshold, wherein the sending the updated script to the script repository system is based on identifying that the updated performance scores meet or exceed the performance threshold.

10. The computing platform of claim 1, wherein the memory stores additional computer-readable instructions that, when executed by the at least one processor, further cause the computing platform to:

based on identifying that all of the performance scores meet or exceed the performance threshold:

send, to an enterprise user device, a script report indicating performance results of the script, and one or more commands directing the enterprise user device to display the script report; and send, to the script repository system, the script and one or more commands directing the script repository system to store the script.

11. The computing platform of claim 1, wherein the memory stores additional computer-readable instructions that, when executed by the at least one processor, further cause the computing platform to:

update, using a dynamic feedback loop and based on one or more of: of the script, the script modification, the discrepancy between the plurality of different permutations of the web page associated and the corresponding expected renderings of the web page, or the performance scores, the AI script fixing engine.

12. A method comprising:

at a computing platform comprising at least one processor, a communication interface, and memory:

receiving a script for a web page, wherein the script is configured to render the web page according to a plurality of different permutations based on system parameters;

executing the script to produce the plurality of different permutations of the web page;

comparing each of the plurality of different permutations of the web page to a corresponding expected rendering of the web page to produce performance scores for each of the plurality of different permutations of the web page;

comparing the performance scores to a performance threshold;

based on identifying that at least one of the performance scores fails to meet or exceed the performance threshold, inputting the script into an artificial intelligence (AI) script fixing engine to produce a script modification to address a discrepancy between the plurality of different permutations of the web page and the corresponding expected renderings of the web page;

updating the script based on the script modification; and sending, to a script repository system, the updated script and one or more commands directing the script repository system to store the updated script.

13. The method of claim 12, wherein the system parameters comprise one or more of device type, operating system, browser, display properties, or interface language.

14. The method of claim 12, further comprising:
identifying the corresponding expected renderings of the web page, wherein the identifying the corresponding expected renderings comprises one or more of:
selecting, from a database of stored expected web page renderings, the corresponding expected renderings of the web page, or
generating, using an AI image/video processing and comparison engine, the corresponding expected renderings of the web page.

15. The method of claim 14, wherein the generating, using the AI image/video processing and comparison engine, the corresponding expected renderings of the web page comprises:
modifying a first expected rendering of the web page associated with a first set of the system parameters based on known properties of a second set of the system parameters.

16. The method of claim 14, wherein the generating, using the AI image/video processing and comparison engine, the corresponding expected renderings of the web page comprises:
modifying a first expected rendering of the web page associated with a first set of the system parameters based on a known correlation between a first expected rendering of a different web page associated with the first set of the system parameters and a second expected rendering of the different web page associated with a second set of the system parameters, wherein the modifying the first expected rendering of the web page produces an expected rendering of the web page associated with the second set of the system parameters.

17. The method of claim 14, further comprising:
training, using historical rendering information, the AI image/video processing and comparison engine, wherein the training the AI image/video processing and comparison engine configures the AI image/video processing and comparison engine to generate the corresponding expected renderings of the web page and the performance scores.

18. The method of claim 12, wherein the performance scores correspond to one or more of functional testing, security validation, performance testing, stability testing, cross operating system testing, and fine tuning script testing.

19. The method of claim 12, further comprising:
training, using historical interface performance discrepancies, historical script modifications, and historical script execution results, the AI script fixing engine, wherein the training the AI script fixing engine configures the AI script fixing engine to output, for a given input script and corresponding performance discrepancy, a proposed script modification.

20. One or more non-transitory computer-readable media storing instructions that, when executed by a computing platform comprising at least one processor, a communication interface, and memory, cause the computing platform to:
receive a script for a web page, wherein the script is configured to render the web page according to a plurality of different permutations based on system parameters;
execute the script to produce the plurality of different permutations of the web page;
compare each of the plurality of different permutations of the web page to a corresponding expected rendering of the web page to produce performance scores for each of the plurality of different permutations of the web page;
compare the performance scores to a performance threshold;
based on identifying that at least one of the performance scores fails to meet or exceed the performance threshold, input the script into an artificial intelligence (AI) script fixing engine to produce a script modification to address a discrepancy between the plurality of different permutations of the web page and the corresponding expected renderings of the web page;
update the script based on the script modification; and
send, to a script repository system, the updated script and one or more commands directing the script repository system to store the updated script.

* * * * *